(No Model.)
G. A. PADDOCK.
HARROW.
No. 366,735. Patented July 19, 1887.
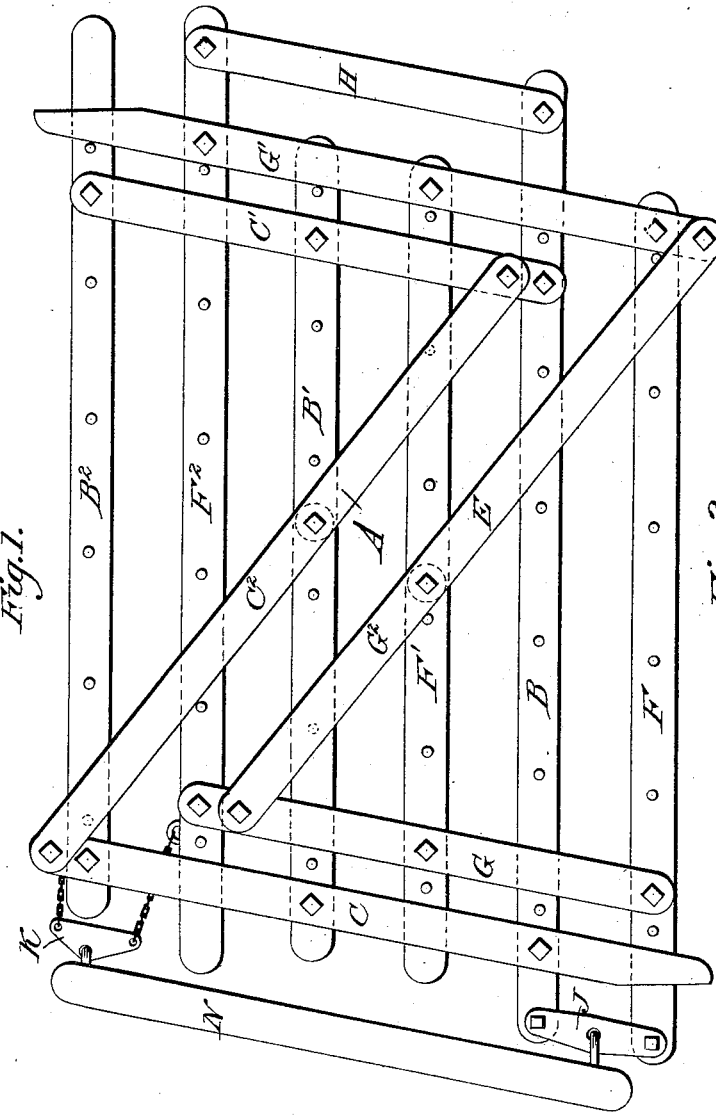
Witnesses.
Lorenzo D. Livermore
Aaron Lockwood
Inventor:
Gustavus Adolphus Paddock

UNITED STATES PATENT OFFICE.

G. ADOLPHUS PADDOCK, OF BEAVER DAM, WISCONSIN.

HARROW.

SPECIFICATION forming part of Letters Patent No. 366,735, dated July 19, 1887.

Application filed February 4, 1887. Serial No. 226,581. (No model.)

*To all whom it may concern:*

Be it known that I, G. ADOLPHUS PADDOCK, a citizen of the United States, residing in Beaver Dam, in the county of Dodge and State of Wisconsin, have invented certain new and useful Improvements in Harrows, of which the following is a specification.

My improvement consists, in part, in giving to each of the teeth in a harrow a movement up and down without either tilting itself or in any way changing the position of either of the teeth next to it on the right or left. By this invention, also, any one of the tooth-bars of the harrow may recede from the team, while the tooth-bars on each side of it are propelled at a correspondingly increased rate of speed, said movement being caused by the progression of the team or by the operator. By this means the distance between the different adjoining teeth is constantly being changed, and sods, stubble, and other trash are quickly thrown out, and the harrow fits well to uneven ground. I attain these objects in the way illustrated in the accompanying drawings, in which—

Figure 1 is a top view of a section of a harrow constructed as proposed by my invention; and Fig. 2, a rear view of one of the connecting cross-pieces, showing the way in which they are attached to the tooth-bars.

The harrow may be made with one, two, or more sections, according to the size required. The number of tooth-bars in a section may also be varied according to the work for which a harrow is intended. As shown in Fig. 1, the section is composed of two frames, A and E. The frame A is made of tooth-bars B, B', and B², held together by cross-pieces C and C', the cross pieces being held up from the tooth-bars by blocks D, as shown in Fig. 2, and held to them by bolts running through bar, block, and cross-piece. A brace, C², is bolted to the cross-pieces, and the center bar, B', (a block as high as the top of the cross-pieces,) being fitted between the brace and bar. The frame E is built same as frame A, being composed of the tooth-bars F, F', and F², cross-pieces G and G', and brace G². The two frames are held in the proper position at the rear end by a strip, H, the said strip being secured by bolts held tightly in tooth-bars B and F² and passing through the ends of the strip, but not fitting tightly in it. The forward ends of the frames are held in position by a short draw-bar, J, fastened same as the strip H, but to bars B and F. A still shorter draw-bar or block, K, is secured to the bars B² and F² by short chains, said chains being secured to the bars by staples driven into their sides. The short draw-bars J and K are secured to the main draw-bar N by staples.

It is evident that if the harrow has but one section a single draw-bar attached to the harrow in front of its center will be sufficient; but if the harrow has two or more sections the bar N should be extended in front of them all, and each section attached substantially in the manner shown. The draw-bar K is made in a triangular form, so that when the harrow is in motion the draft will naturally tend to keep the strip H nearly parallel with the cross-pieces; but every unevenness of the ground and every obstruction, even of sods or stubble, will give a vibrating or combing motion to the frames, thus clearing the teeth, and thereby improving the work of the harrow and lightening its draft. The operator may also cause either of the frames to recede from the team by stepping on that end of the strip H which is fastened to the said frame. Much lifting of the implement is thus avoided in all heavy stubbles.

The tooth-bars may, if preferred, be made to stand at right angles to the course pursued by the team, in which case the connecting cross-pieces would run from front to rear.

The mode of attachment and shape of the draw-bar K may be varied, as it makes but little difference whether it is straight or merely a sheave with a chain running around it, or a segment of a circle, the only important point being that it shall oscillate, so as to give the vibratory motion to the teeth.

It will be seen that both ends of the frame A may rise until the bars B strike the cross-pieces G, thus neither being tilted itself nor giving a tilt to the frame E. In like manner the frame E may rise until the bars F strike the cross-pieces C. The amount of play in either case is regulated by the height of the blocks D.

In an iron or steel frame harrow the cross-pieces may very properly be bent, so as to dispense with blocks D.

I am aware that harrows have been used in which a series of clod crushers or smoothers work between the rows of teeth. My invention does not, therefore, embrace all overlapping frames in a harrow, but only those in which each of the two frames carry teeth for working up the soil; neither does it embrace a harrow wherein the tooth-bars may freely rise and fall at one end, while the other end is held to the main frame by joints or springs. The vertical motion claimed is simply one in which both ends of the bar are free to rise and fall simultaneously.

I claim as my invention--

1. In a harrow, a tooth-bar so connected to the tooth-bars on each side of it as to vibrate forward and backward between them, substantially as shown.

2. In a harrow, a tooth-bar with a vibrating connection to each of the tooth-bars next to it, substantially as described.

3. In a harrow, a tooth-bar with a vibrating connection to each of the tooth-bars next to it, both ends of said bars being free to rise and fall simultaneously and without tilt, substantially as described.

4. Two different frames in a harrow, each provided with teeth, each overlapping the other, and each free to play vertically independent of the other, substantially as described.

5. The combination, in a harrow, of two different frames, each having two or more tooth-bars, said bars being placed alternately, as described, and said frames having a vibrating connection, substantially as shown.

6. Two different frames in a harrow, each containing two or more tooth-bars rigidly connected, said bars alternating, as described, and each frame free to move independently of the other, substantially as shown.

7. In a harrow, the combination of tooth-bars F, with a tooth-bar, B, between them, and an oscillating connection, substantially as shown.

8. In a harrow, the combination of tooth-bars B, with intermediate tooth-bars F, and an oscillating draw-bar, K, substantially as described.

9. In a harrow, the combination of tooth-bars F, held in place by a cross-piece, G, and a tooth-bar, B, playing freely under said cross-piece, substantially as shown.

In testimony whereof I affix my signature in presence of two witnesses.

G. ADOLPHUS PADDOCK.

Witnesses:
E. C. PRATT,
L. D. LIVERMORE.